United States Patent [19]
Barber et al.

[11] Patent Number: 5,923,325
[45] Date of Patent: *Jul. 13, 1999

[54] SYSTEM AND METHOD FOR ENHANCING CONVEYED USER INFORMATION RELATING TO SYMBOLS IN A GRAPHICAL USER INTERFACE

[75] Inventors: Ronald Jason Barber, San Jose; Edwin Joseph Selker, Palo Alto, both of Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/748,758

[22] Filed: Nov. 14, 1996

[51] Int. Cl.⁶ .................................................. G06F 3/00
[52] U.S. Cl. ........................................................ 345/336
[58] Field of Search .................................. 395/336, 337, 395/338, 333, 334, 348, 349; 345/336, 337, 338

[56] References Cited

U.S. PATENT DOCUMENTS

| | | | |
|---|---|---|---|
| 4,813,013 | 3/1989 | Dunn | 345/333 |
| 4,914,568 | 4/1990 | Kodosky et al. | 345/349 |
| 5,134,560 | 7/1992 | Ferriter et al. | 364/188 |
| 5,169,342 | 12/1992 | Steele et al. | 434/112 |
| 5,191,645 | 3/1993 | Carlucci et al. | 345/328 |
| 5,235,679 | 8/1993 | Yoshizawa et al. | 345/336 |
| 5,261,044 | 11/1993 | Dev et al. | 345/357 |
| 5,287,448 | 2/1994 | Nicol et al. | 345/347 |
| 5,303,388 | 4/1994 | Kreitman et al. | 345/348 |
| 5,317,687 | 5/1994 | Torres | 345/349 |
| 5,347,628 | 9/1994 | Brewer et al. | 345/351 |
| 5,365,360 | 11/1994 | Torres | 345/348 |
| 5,367,626 | 11/1994 | Morioka et al. | 345/348 |
| 5,377,319 | 12/1994 | Kitahara et al. | 345/337 |
| 5,388,993 | 2/1995 | McKeil et al. | 345/336 X |
| 5,408,655 | 4/1995 | Oven et al. | 707/501 |
| 5,481,667 | 1/1996 | Bieniek et al. | 345/338 |
| 5,488,685 | 1/1996 | Palmer et al. | 345/338 |
| 5,494,444 | 2/1996 | Thayer et al. | 434/364 |
| 5,627,958 | 5/1997 | Potts et al. | 345/336 |
| 5,657,462 | 8/1997 | Brouwer et al. | 345/336 |
| 5,682,469 | 10/1997 | Linnett et al. | 345/473 |

OTHER PUBLICATIONS

Foley, J.D., "Model–based User Interface development tools," Eurographics Workshop Design, Italy, Jun. 8–10, 1994, pp. 7.

"Review of—Packard Bell's Navigator Dec. 12, 1993", Newsbytes News Network (Dec. 23, 1993).

Overview: Apple Guide 2.1 Features for OpenDoc, Apr. 8, 1996. http://www.macos.apple.com/Apple_Guide/dev/ag2.1od.html (Apple Guide Webpage).

*Primary Examiner*—A. Katbab
*Attorney, Agent, or Firm*—Gunster, Yoakley, Valdes-Fauli & Stewart

[57] ABSTRACT

A system and method are provided, for use with a computer graphical user interface (GUI) system, for giving the user help information associated with displayed symbols, such as icons representing data objects, applications, etc. For a given icon or other symbol, a plurality of different images are provided. When help is invoked, such as in response to a user moving the display cursor onto the icon, the plurality of help images are displayed. The images may represent a sequence of actions the user is to take, in order to make use of the object represented by the icon. The images are then displayed in time sequence. The images may then include reminder images of what had taken place prior to the image currently being displayed. Alternatively, the images may represent a set of alternative uses to which the user may put the object. In this case, the images may also be displayed one at a time, for a given duration each, or may be displayed simultaneously, around the perimeter of the icon or otherwise near the icon, to allow the user to observe and choose from among the alternatives.

21 Claims, 14 Drawing Sheets

| Coach Graphical Help System for WorkPlace |

Drag and Drop - Level 2

WHAT> 'Drag and drop' moves or copies the chosen object.

HOW> - Move an object by moving the pointer on top of the object.
- Drag it to the new location while holding down mouse button 2.

Copy an object in a similar fashion:
Drag and drop while holding down the CONTROL key.
(Mnemonic hint: 'C'OPY = 'C'ONTROL).

OS/2 System

Color Palette

OS/2 System

Color Palette

OS/2 System

Color Palette

OS/2 System

Color Palette

OPEN

OS/2 System

Color Palette

OPEN

OS/2 System

Color Palette

SYSTEM AND METHOD FOR ENHANCING CONVEYED USER INFORMATION RELATING TO SYMBOLS IN A GRAPHICAL USER INTERFACE

FIELD OF THE INVENTION

The invention generally relates to the field of computer graphical user interfaces. More specifically, the invention relates to information-providing symbols, such as icons, displayed in connection with the "help" feature, to provide information to the user of such a graphical user interface.

BACKGROUND OF THE INVENTION

As the functionality and complexity of computers has increased, there has been a correspondingly increased need for an effective "help" system for informing the user what functionality is available and how it works.

Generally, help messages can be regarded as either passive or active. Passive help is help that the user must seek out by taking affirmative steps. Passive help is typically provided in terms of a "Help" pull-down menu. The user activates the "Help" pull-down menu by clicking on a "help" legend, commonly appearing in the top bar of an application window. The pull-down menu then gives the user options, such as a keyword search on topics for which help is available.

An example of more active help is given in Nicol et al., U.S. Pat. No. 5,287,448, "Method and Apparatus for Providing Help Information to Users of Computers." When a user positions the cursor on an icon representative of a function made available by an application, such as a "cut" or "paste" icon in a word processor, a text label appears, identifying the function of the icon. The label remains as long as the cursor remains on the icon, and disappears when the cursor moves off the icon.

Such active forms of help give the user subtle but timely guidance just as the user is apt to need the guidance. A well-designed system should provide a wide variety of such forms of help. The help should be tailored to what the user's needs are likely to be at any given moment in a working session. The number of different forms of such help are limited only be the system designer's imagination and ability to foresee what sort of help a user is likely to need.

Therefore, there is a continuing need for new, creative ideas as to how to provide help information that can further assist the user.

Some prior art systems have explored the possibility of making icons themselves more informative. One way of increasing the visual cue information available to the user is through the use of multi-dimensional icons, as described in U. S. Pat. Nos. 5,365,360, Torres, "Method and Apparatus for Presenting Information Contained Within a Data Icon by Assigning Attributes to Various Dimensions of the Data Icon" and 5,303,388, Kreitman et al., "Method to Display and Rotate a Three-Dimensional Icon with Multiple Faces." In these patents, icons representing three-dimensional objects are provided. That is, the icon looks like a three-dimensional object, such as a rectangular prism, rather than looking simple like a two-dimensional image. Such an icon is rotatable, adding to the impression of three-dimensionality. The various sides of the rotatable icons reveal different informative aspects of the objects the icons represent.

Another example is given in U.S. Pat. No. 5,347,628, Brewer et al., "Method of Graphically Accessing Electronic Data." An image, such as a perspective view of an office, is given. A desk is shown, having drawers which represent data or applications. Through use of a mouse to manipulate the GUI, the user opens a window by causing one of the desk drawers to open. The metaphorical office, described in the patent as an "icon," thus reflects the status of the system: the desk drawer is shown as open, reflecting the open status of the corresponding window. Note, however, that while the system status is represented in concise and understandable form, the disclosed system and method do not provide proactive guidance to the user as to what he/she should do to accomplish a desired task.

Accordingly, while icons themselves can be made to represent different types and quantities of information, help information associated therewith has not fully explored all help possibilities. In particular, which it may be self-evident from an icon what sort of object the icon represents, there is not necessarily any indication of how a user is to go about using the object. Conventional help information, such as that given in the Nicol et al. '448 patent discussed above, has not provided this level of information.

Therefore, there remains a need for a GUI help system that proactively shows a user how to go about performing a task to achieve a desired result.

SUMMARY OF THE INVENTION

It is therefore an object of the invention to provide help information to the user, in a form and manner not previously made available.

It is a further object of the invention to provide help information which helps a user understand how to go about using a object represented by a GUI symbol such as an icon.

It is yet another object of the invention to provide help information which helps a user understand what alternatives may be available for using an object.

It is yet another object of the invention to provide help information which helps a user understand what sequence of actions must be taken to use an object.

To achieve these and other objects, there is provided, in accordance with the present invention, a method and system, for use with a graphical user interface (GUI) system, for providing a user with information on functionality associated with a symbol displayed on the GUI system. While the invention may be practiced with any object displayed on a GUI, such as a window, a thumbnail image, etc., it is contemplated that the invention will have particular applicability to icons representative of functions the user is likely to want to execute.

The method essentially comprises the following step:

Responsive to a user action, a plurality of images are displayed. Each one of the plurality of images represents a respective aspect of the functionality associated with the symbol.

In some cases, a given icon might represent a function operable in more than one way. For instance, a printer icon might be displayed on a GUI desktop. One way to print a document might be to drag an icon representative of a text file, and drip the text file icon onto the printer icon. Alternatively, clicking on the printer icon might open a window, in which the user is prompted to identify a file to be printed, such as by typing the file's name and location within a directory structure. For such icons, the method of the invention produces a set of images, each image representing and illustrating one of the alternative operations of the function. These images are understood to be alternatives to each other, i.e., to represent actions that are alternatives to each other.

In other cases, where user operation of the symbol causes a sequence of actions to take place, the plurality of images represent the sequence of actions. The images may take the form of an animation sequence that represents the sequence of actions. Alternatively, the images may be a set of still images which are understood to represent stages of the sequence of actions. Such a help system such as that provided in accordance with the invention is useful, because it helps the user understand what sort of functions are available. The understanding is enhanced, beyond what is provided by conventional help systems, because the displayed images represent not only what command the icon represents, but also how to go about executing the action brought about by that command. Thus, the user not only knows what will happen, but what actions the user must be prepared to make, in order for that action and result to take place.

Accordingly, by presenting either alternative actions or a sequence of steps making up an action, the plurality of help images presented in accordance with the invention give the user advantageously useful help, to further enhance the user-friendliness of a GUI system.

While the invention is primarily disclosed as a method, it will be understood by a person of ordinary skill in the art that an apparatus, such as a conventional data processor, including a CPU, memory, I/O, program storage, a connecting bus, and other appropriate components, could be programmed or otherwise designed to facilitate the practice of the method of the invention. Such a processor would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. It will be understood that such apparatus and articles of manufacture also fall within the spirit and scope of the invention.

DESCRIPTION OF THE PREFERRED EMBODIMENT

The description of the invention which follows will focus primarily on icons, as a preferred example of GUI symbols, objects, etc., with which the invention is preferably practiced. However, it will be understood that other user interface elements or GUI symbols also have applicability to the invention, as would be understood by a person skilled in the art, in light of the description provided herein. Such other symbols include, but are not limited to, pull-down menu labels and entries, toolbar entries, sliders, softkeys, application window controls such as scroll slider bars, etc.

HOW THE INVENTION OPERATES

Figure 1:
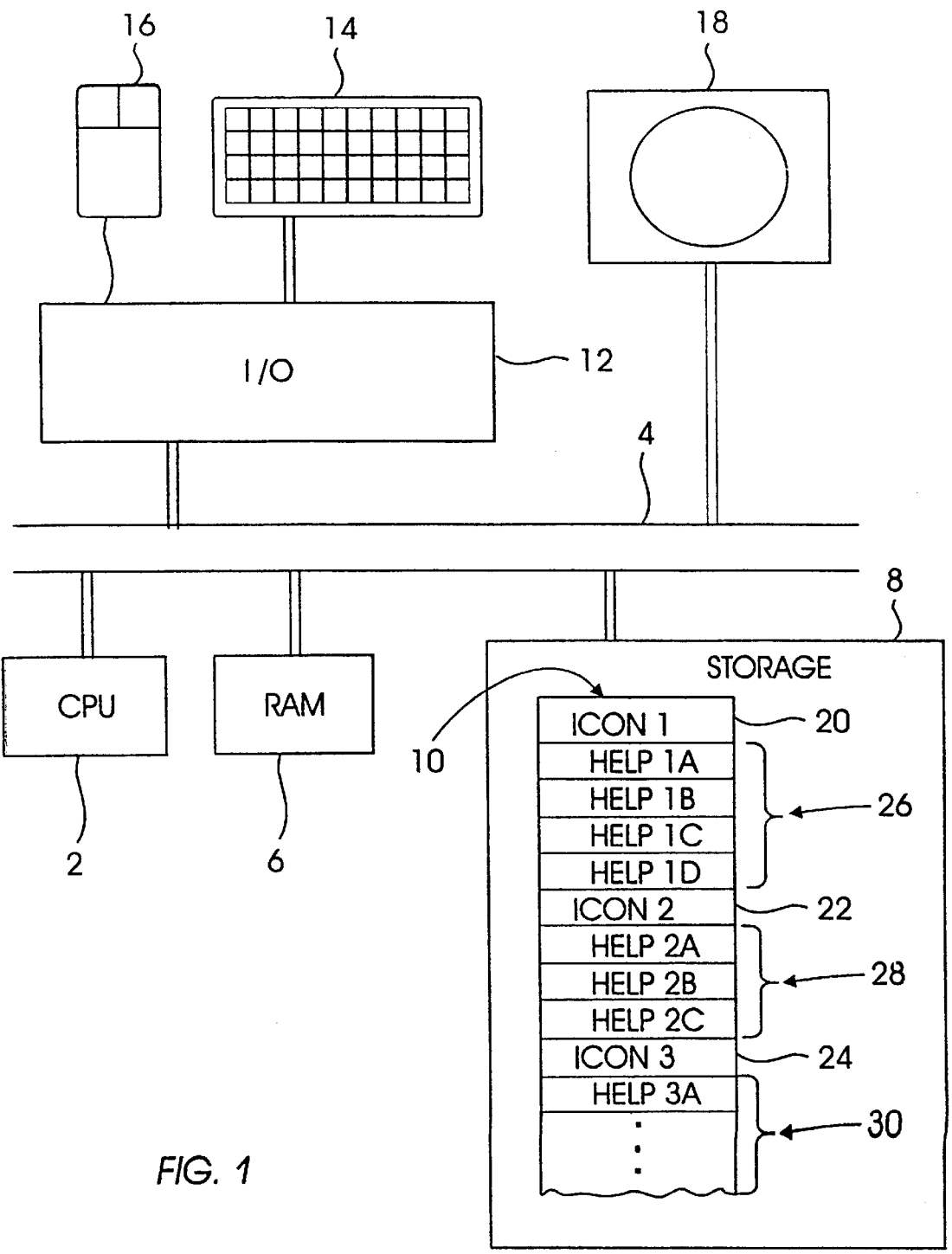
FIG. 1 is a block diagram of a computer system for practicing the invention.

FIG. 1 is a block diagram of a computer system for practicing the invention. A central processing unit (CPU) 2 is coupled to an internal system bus 4. Also coupled to the bus are random-access memory (RAM) 6 and storage 8. The storage 8 can include read-only memory (ROM), a disk drive, etc. The storage 8 includes a program for directing the CPU 2 to perform the method of the invention (described below). The storage 8 also includes help information, shown generally as 10 (which will also be described below). The system of FIG. 1 also includes an input/output (I/O) interface 12, through which is coupled a keyboard 14 and a mouse 16 for the user's use. Finally, a display 18 is provided for displaying GUI information, including icons and other symbols.

Conventionally, storage for supporting a GUI includes information for displaying a symbolic representation of a data object, an application program, etc., in the form of an icon. The stored information includes the appearance of the icon (often user-selectable) and information, such as a pointer, which relates the stored information to the actual represented data object or application. Such stored information is shown schematically, for three icons, as data entries 20, 22, and 24 in the storage 8.

In accordance with the information, help information is also stored in the storage 8. The help information includes images which are displayed in association with the respective icons responsive to a user action representing a request for help. For instance, the help information for a given icon is preferably displayed when the user uses the mouse 16 to move a cursor, shown on the display 18, onto a displayed icon. The images making up the help information are shown in FIG. 1 as data entries 26, 28, and 30.

Many of the examples of such help information given below are icons or icon-like small images. However, it will be understood that the help images provided in accordance with the invention can also include other visible display modalities such as text or reduced-size desktop environment representations, separately or in combination. Additionally, non-visual modalities such as sound may be used. Any such help information, regardless of modality, may be stored, in any format suitable for that particular type of modality, in a data structure such as that illustrated in FIG. 1.

Of course, the particular type of data structure used is not essential to the invention. The example of FIG. 1 lends itself well to the present explanatory discussion, and may also be regarded as a preferred arrangement in many situations. While it may be convenient to store the data entries adjacent to each other in physical storage, as suggested in FIG. 1, any alternative arrangement, which would be considered suitable by a person skilled in the art, may be used.

Figures 2, 3:
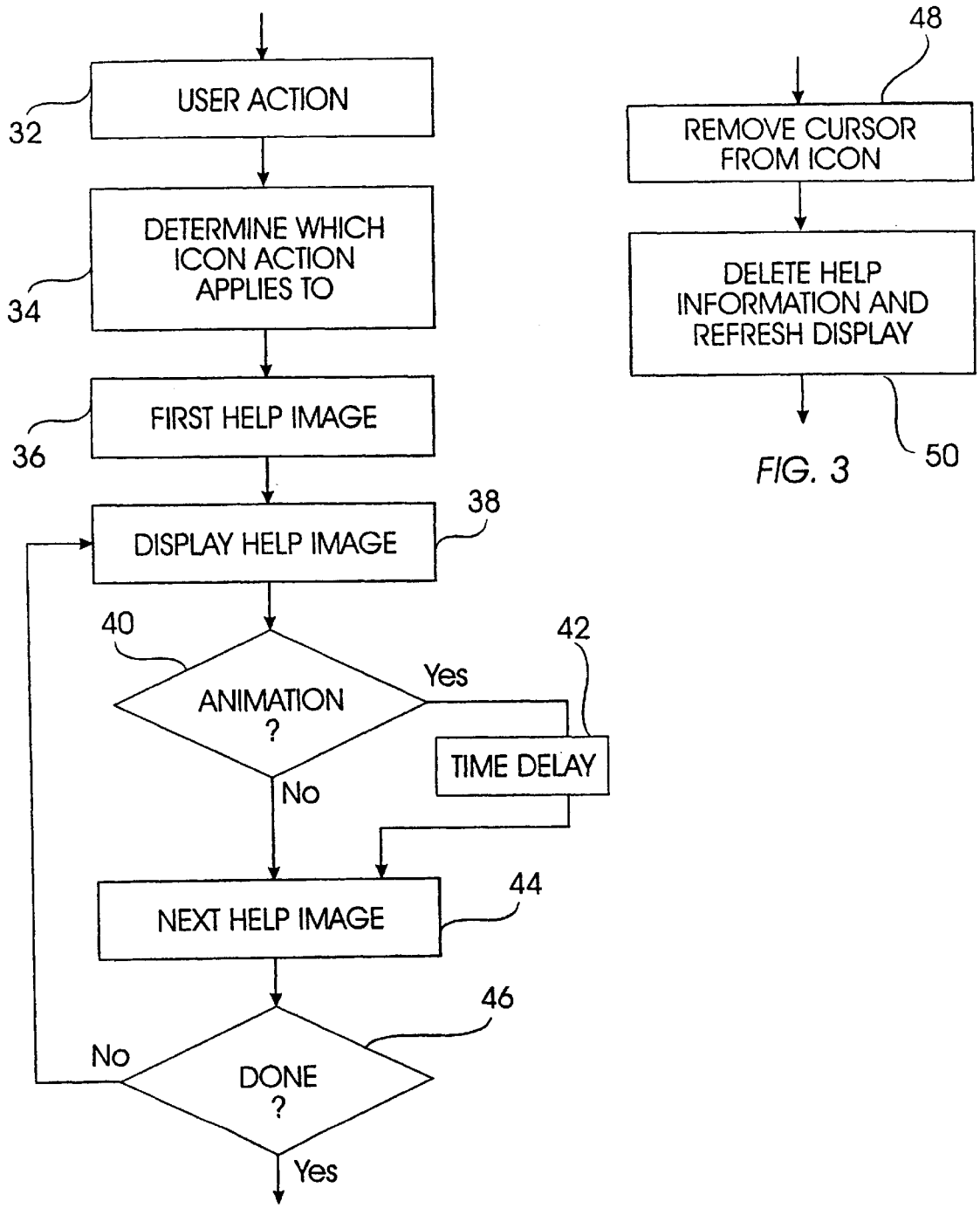
FIGS. 2 and 3 are flowcharts showing aspects of the invention as executed by the system of FIG. 1.

FIG. 2 is a flowchart showing the operation of the invention. In accordance with the invention, the flowchart of FIG. 2 is implemented in computer program code, as could be done by a programmer of ordinary skill in the art.

This code is preferably executed in response to a user action 32, from an idle routine in which system overhead is executed and out of which interrupt-driven tasks are executed. Indeed, the code of FIG. 2 itself might be executed in response to an interrupt or other process in which a user action, such as the movement of a mouse onto a displayed icon, the typing of a suitable control key, or a combination thereof, is detected.

In particular, where a given object has broad capabilities, the user may need to specify what sort of help is needed. For instance, if an icon represents a document, then separate help information may be provided, in accordance with the invention, for copying the document, and for printing it. The suitable help information may be selected by a suitable user action, such as (i) moving the cursor onto the icon, and then (ii) typing a command key corresponding with the particular help desired.

It is assumed that a plurality of icons or other symbols are displayed, for which help according to the invention is to be provided. Therefore, step 34 determines what displayed symbol help is desired. This may be done by superimposing the displayed cursor position, controlled by mouse movement, onto the known positions of the displayed symbols. Once this is done, the storage 8 of FIG. 1 is consulted, and the stored information for the symbol is identified.

Let us say, for example, that the displayed symbol is the symbol identified schematically as "ICON2." The data entries 28 contain the help information for ICON2. Therefore, the first help image, designated "HELP2A," is accessed (step 36).

Since a plurality of help images are to be displayed, FIG. 2 is shown as a loop. Therefore, variations on the loop software architecture which would be known to a skilled programmer may be substituted.

In step 38, the help information is displayed. In the example, the first help image associated with ICON2, called HELP2A, is displayed.

Depending on the nature of the help information, there may be a need for a real-time, visible delay between successive help images. If the help is a set of images, all of which are to be shown simultaneously, no such time delay is needed. On the other hand, if the help information is to be displayed as animation, there will be such a delay. This choice is tested for in step 40, and if appropriate, a time delay 42 is provided.

The loop continues in steps 44 and 46. Step 44 moves to the next help image. Where HELP2A has just been displayed, it moves to HELP2B. Step 46 performs a loop test to see if the routine is finished. HELP2B and HELP2C are yet to be displayed. Therefore, twice, step 46 directs processing back to step 38. Finally, after all three help images have been displayed, step 46 ends the procedure.

FIG. 3 complements FIG. 2 by removing the help information. In response to a user action such as moving the cursor off ICON1 (step 48), the help information is removed from the display, and the information (such as a region of plain desktop) adjacent to the icon is refreshed (step 50).

EXAMPLES OF HELP INFORMATION PROVIDED ACCORDING TO THE INVENTION

For illustrative purposes, a few of the numerable possible forms of help information in accordance with the invention will be described in detail. Once the invention has been so illustrated, for brevity other forms of help information in accordance with the invention will be described with less detailed illustration. However, it will be understood that many forms of help information, tailored to the particular function to be illustrated and to the general circumstances, also fall within the spirit and scope of the invention as claimed.

Referring to FIGS. 4, 5, 6, 7, and 8, a sequence of help images is provided to show how to print an object by dragging and dropping its icon 52 onto a printer icon 54. This is an example of a set of help images which illustrate a sequence of events. The images may be shown as an animated sequence, or may appear, one by one, and remain displayed, so that at the end, all the steps of the sequence are shown. Also, the steps may appear in sequence, but some of the steps, such as the intermediate steps, are replaced by ghost images, place-holding images such as dots, etc., to show that an event has already taken place, even though it is not still expressly shown.

Figure 4:
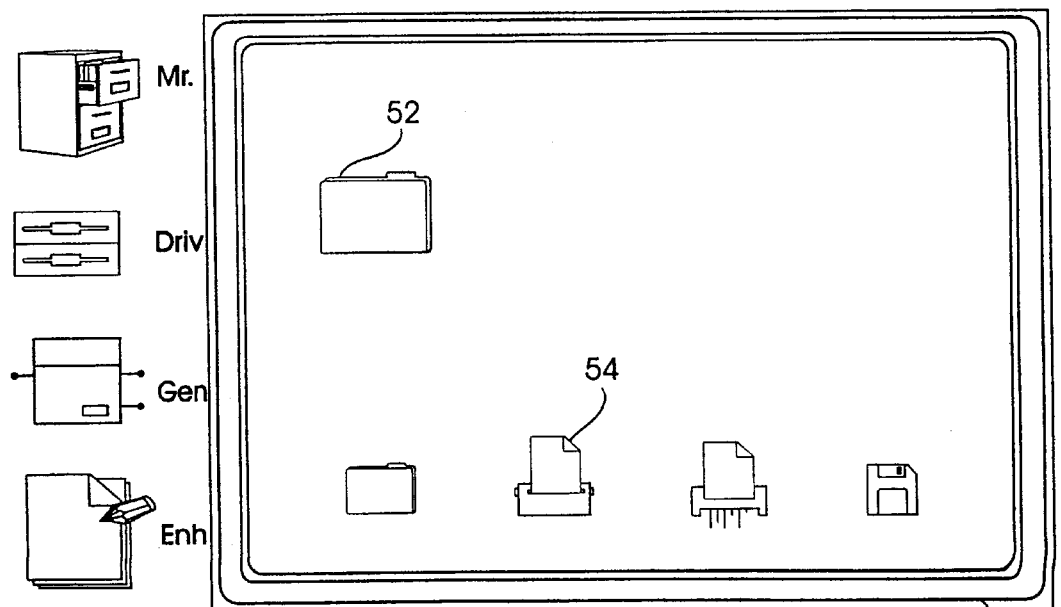
FIGS. 4, 5, 6, 7, and 8 are representations of a graphical user interface, showing a sequence of images displayed in accordance with the invention.

FIG. 4 shows an initial state, in which no help information is yet displayed. Various icons are displayed on a desktop.

Figure 5:
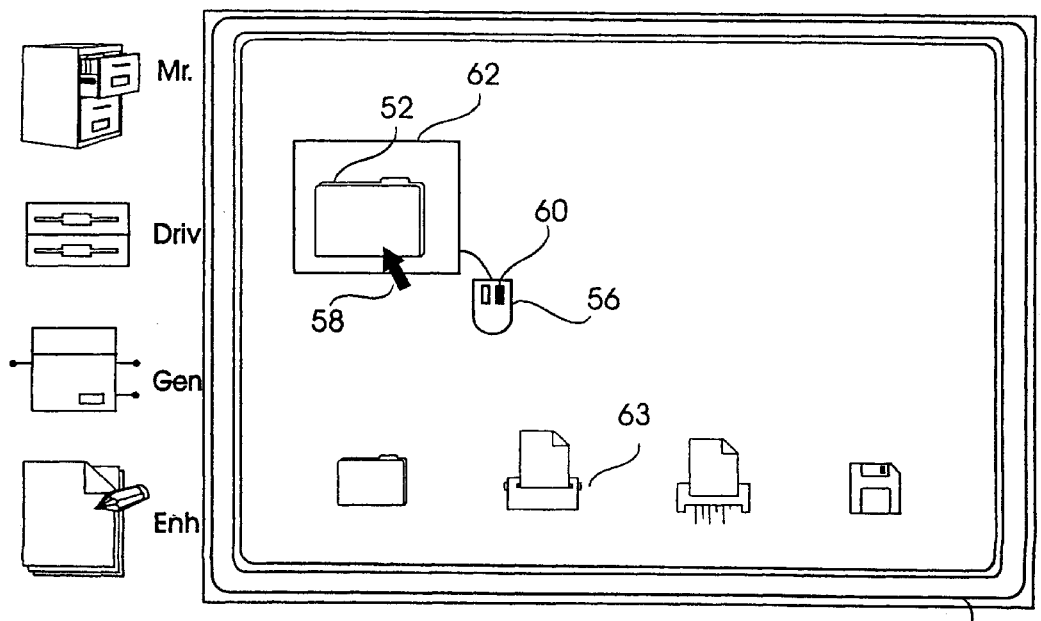

In FIG. 5, the object 52 is selected for printing. The first help image illustrates that a mouse 56 is manipulated so as to move a cursor, represented by an arrow 58, onto the object 52. The right mouse button 60 is depressed. This is shown by a suitable means, such as by the dark color of the right button on the mouse 56. Accordingly, a select box 62 appears around the object 52. Note also a printer icon 63, upon which the object 52 is to be printed.

Figure 6:
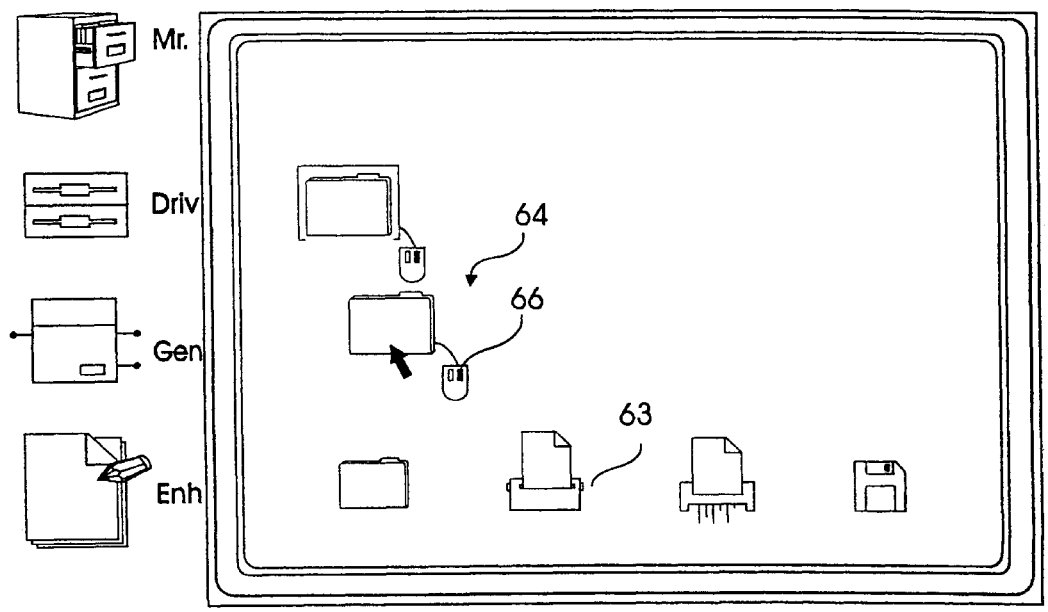

In FIG. 6, the image of FIG. 4 remains as before, but is duplicated by another image, generally shown as 64. The image 64 has moved downward and to the right, toward the printer 63. Note that a mouse button 66 of the image 64 is darkened, to indicate that this button is still depressed.

Figure 7:
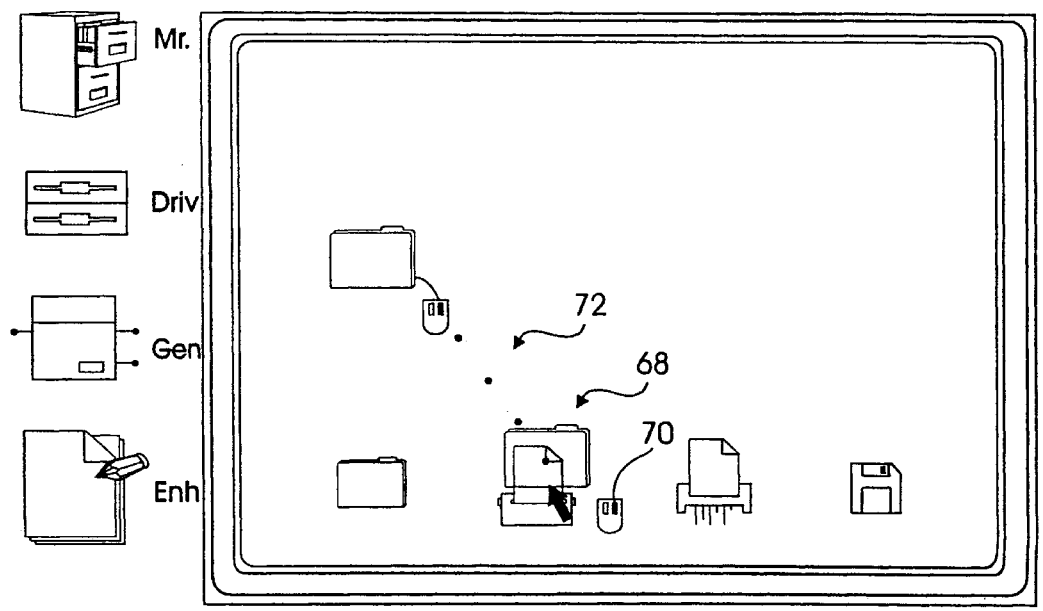

In FIG. 7, the object 52 is directly on the printer 63. By a suitable arrival indicator means such as light shading or a box enclosure, it is shown that the object 52 is on the printer 63, rather than merely being nearby. Note again that a right mouse button 70 remains depressed. Note additionally that a path indicator, shown as a sequence of dots 72, marks the pathway over which the mouse has dragged the object 52.

Figure 8:
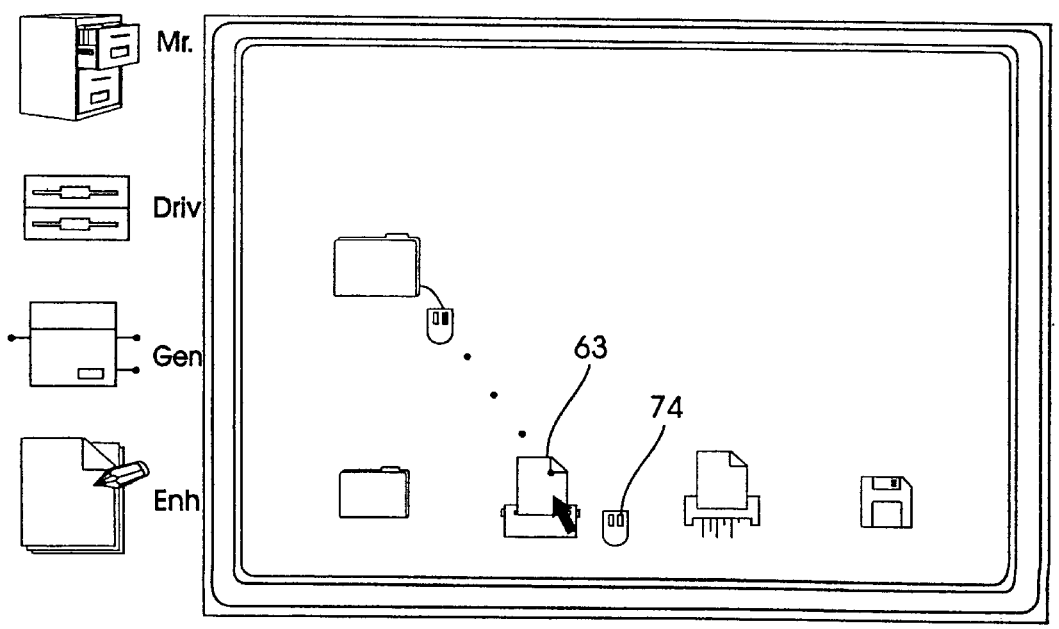

Finally, in FIG. 8, a mouse 74 shows no darkened buttons, indicating that the right button has been released. The object 52 is no longer visible on top of the printer 63, indicating that the process is complete.

Thus, FIGS. 4–8 illustrate a preferred way in which a sequence of help images are displayed so as to indicate to a user what actions he/she must take (depressing the right mouse button), how the object is to be moved (through the path indicated by the sequence of images and the path indicator 72), and how to know when the object 52 has reached the printer 63 (the arrival indicator). This result is achieved by having the sequence of images for display, and by displaying them in a suitable sequence.

Help images may employ the actual icons shown, e.g., the icons on the desktop. In such implementations, it may be helpful to the user to provide some form of highlighting for the portions of the displayed information that pertain to the subject matter to which help information applies. For instance, the display might be shaded, except for the icon to which the help applies, and for the help images provided. Alternatively, the portion of the display not relevant to the help might be rendered in light or pastel colors, similarly to the way in which items in a pull-down menu which are not applicable to a current state of a conventional system, are shown in light gray, while those menu items that are relevant are shown in black.

Alternatively, a separate window 76 may be overlaid on the display screen, containing icons for which the help information is to be provided. Also, the help information may optionally include text 78, explaining the function for which the help information is being provided.

While the foregoing example illustrated a sequence of distinct images that, when displayed one after the other, shows a sequence of user steps, the next example shows a somewhat more express example of "animation", in that a given image changes its appearance during the course of the help sequence.

FIGS. 9, 10, 11, 12, 13, and 14 are images of a "Color Palette" icon 80, showing how the user is to open the software object represented by the icon. The help is an animation sequence, in which a succession of mouse images appear. In accordance with the invention, a sequence of mouse button clicks are shown by a series of help images, illustrating the pressing and releasing of a mouse button by the darkening and lightening of an image of the button on the mouse image. Moreover, to remind the user of what has taken place, prior mouse images remain visible as successive mouse images, showing successive activities, appear.

Figure 9:
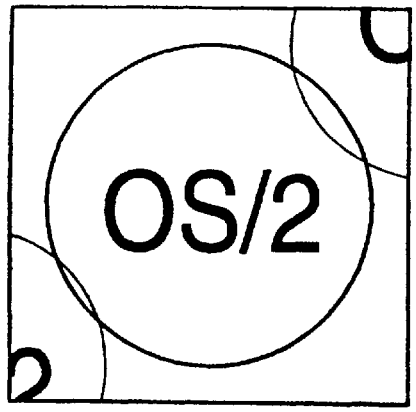
FIGS. 9, 10, 11, 12, 13, 14 and 15 are representations of a graphical user interface, showing another sequence of images displayed in accordance with the invention.
Figure 9:
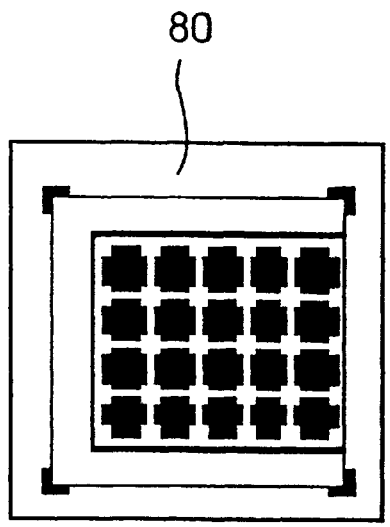
Figure 9:
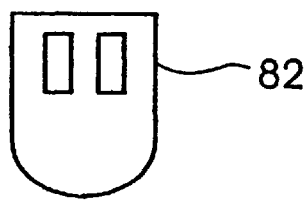

During a first time interval of the animation sequence, only one mouse image 82 is visible. The animation shows the act of positioning a mouse-driven cursor 84 on the icon 80. FIG. 9 represents the help image of the mouse next to the Color Palette icon 80. Note that at this initial time, neither of the mouse buttons are depressed. The animation then darkens the left mouse button 86, indicating a single left button click. Afterwards, the help image appears as shown in FIG. 1 0.

Figure 10:
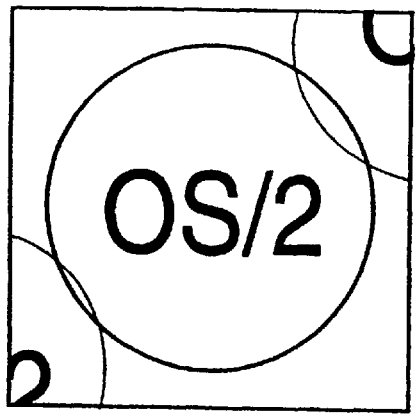
Figure 10:
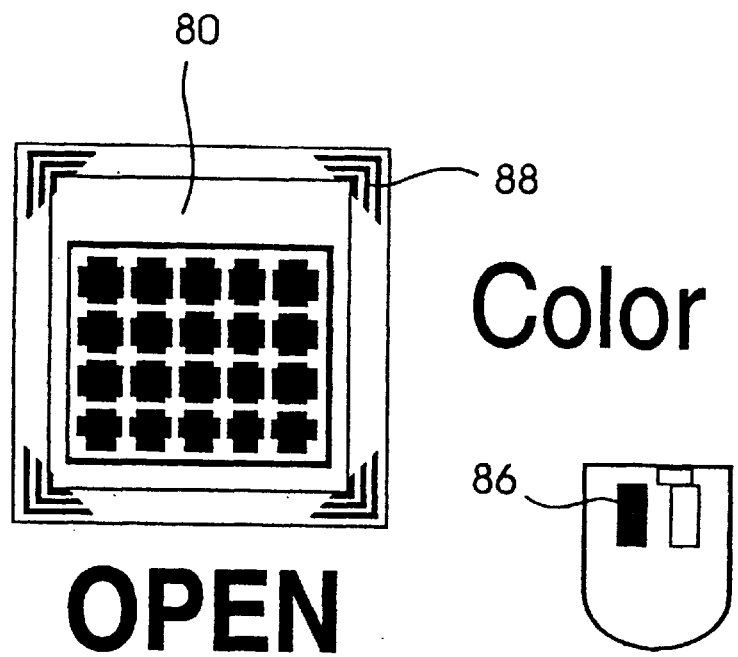
Figure 10:
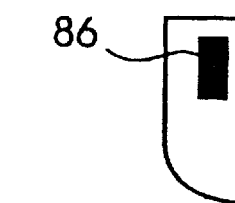

Note also that the help information indicates activity on the icon 80 itself, by showing icon highlight information 88 such as several concentric frame outlines. In FIG. 10, this icon highlight information 88 shows that the first mouse click 86 has the effect of selecting the icon 80. Different forms of icon highlight information may be used, such as framing, bezeling to suggest three-dimensionality, additional animation, color changing, etc.

The animation proceeds to show a second mouse image 90. It is anticipated that the user will understand that a plurality of mouse images represents a sequence of user activities. It is presumed to be intuitive that moving left to right corresponds with moving forward in time. Therefore, the left mouse image 86 (or, more generally, all but the rightmost mouse image) represents a reminder of actions that have already taken place, and the right (or rightmost) mouse image 90 represents actions presently being taken. While the chronological arrangement in this example is from left to right, any other suitable arrangement may also be used.

Figure 11:
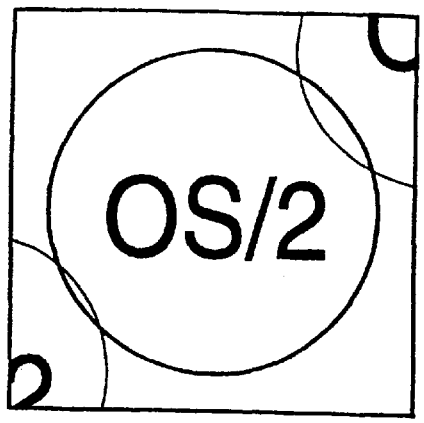
Figure 11:
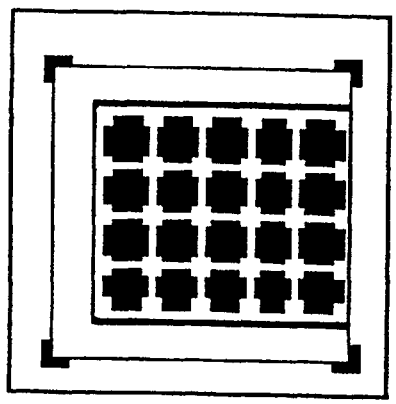
Figure 11:
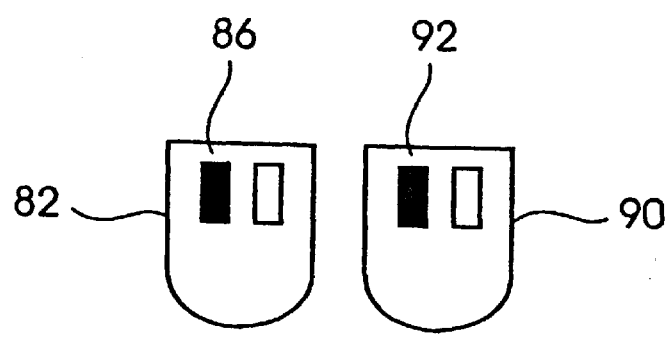

FIG. 11 shows two mouse images 82 and 90, each one showing a darkened left button 86 and 92, respectively. The left image 82 is a reminder that the cursor was positioned on the Color Pallette icon 80, and that the left mouse button 86 was clicked. The right mouse image 90 shows that, as of this moment, the left mouse button 92 is still pressed.

Figure 12:
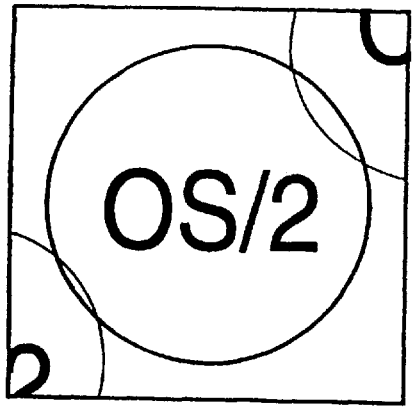
Figure 12:
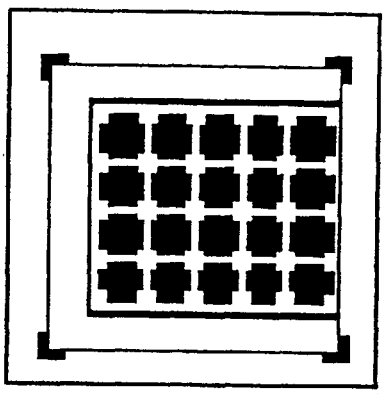
Figure 12:
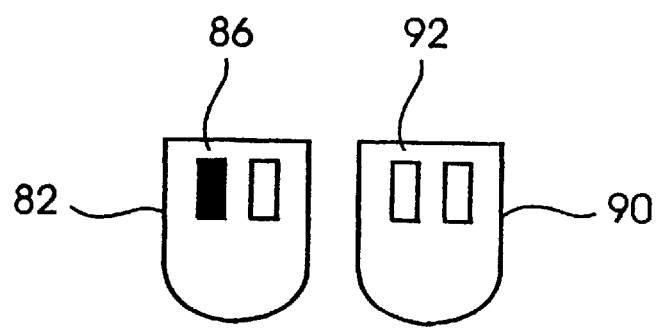

The next action shown in the animation is the release (lightening) of the left mouse button 92. FIG. 12 also shows the two mouse images 82 and 90, but this time, only the first (leftmost) image 82 shows a darkened left button 86. Thus, this image represents a time subsequent to the release of the left button. At this point, the first mouse image 82 shows that the left button 86 was depressed, and the second mouse image 90 shows that the left button 92 was released.

Figure 13:
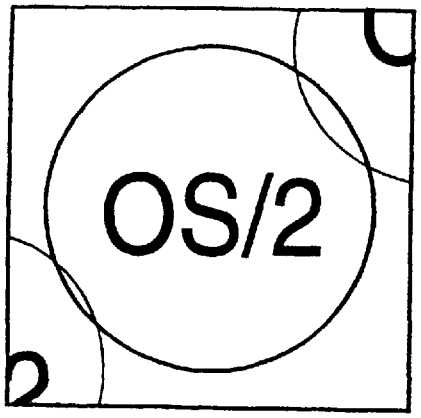
Figure 13:
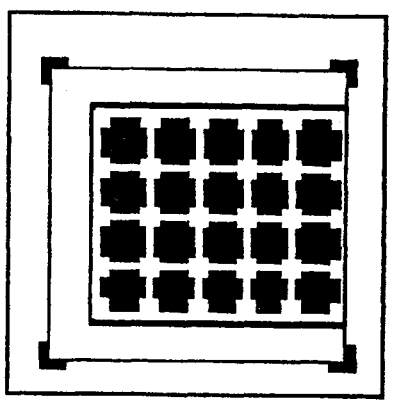
Figure 13:
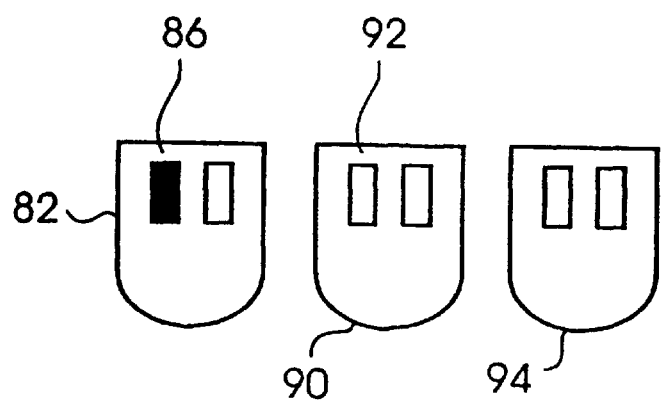

The next step of the animation is the appearance of a third (rightmost) mouse image 94. FIG. 13 shows three mouse images 82, 90, and 94. The first two (leftmost and middle) correspond with the two mouse images 82 and 90 of FIG. 12, and represent reminders to the user of the depressing and releasing of the left button 86 and 92, respectively.

Figure 14:
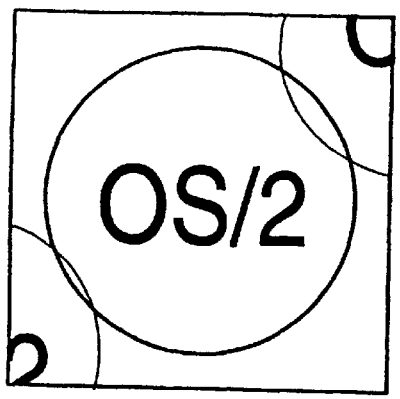
Figure 14:
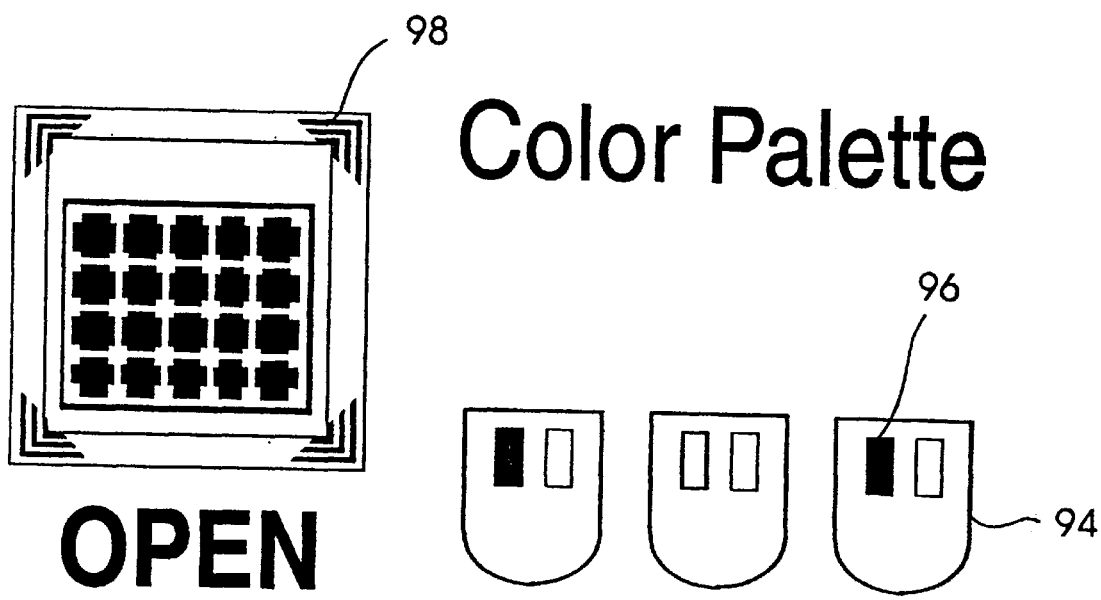

The animation then proceeds to show a second depressing of the left mouse button 96. FIG. 14, which is displayed immediately after FIG. 13, shows three mouse images, and differs from FIG. 13 in that the third mouse image 94 shows a darkened left button, indicating that the left button 96 is to be pressed a second time. Note also that the help information again indicates activity on the icon 80 itself by showing icon highlight information 98 such as several concentric frame outlines. In FIG. 14, this icon highlight information 98 shows that the first and second mouse clicks, in rapid sequence, have the effect of opening the icon.

A caption 100 "OPEN" appears beneath the icon throughout the help animation sequence, informing the user that the information provided is the procedure for opening the application represented by the icon 80. Optionally, in FIG. 14, the caption can be modified, such as by color changing, reverse video, outlining the letters in a contrasting color, etc., to inform the user that the animation sequence has reached completion, and the identified task has been accomplished.

Accordingly, FIG. 14, the final displayed help image of the animation sequence, tells the user that the process of opening Color Palette includes a first left button click (leftmost reminder image), a release of the left button (middle reminder image), and a second left button click (rightmost image).

The overall time duration of the animation sequences, and the lengths of the time segments during which each of the successive help images are displayed, may be chosen to suit the particular help information being displayed. For the sequence just described, the following factors may be used to lead to a preferred sequence of time durations:

First, the first mouse image 82 (FIG. 9) may be displayed a relatively long time, to be sure that the help information has the user's attention. In particular, if accompanying help text is provided, then enough time should be provided that a person with an average reading speed should have plenty of time to both read the text and orient himself/herself to the graphical subject matter being displayed. Alternatively, a user action, such as a keystroke or a mouse button click, may be used as a prerequisite for starting the animation sequence.

Secondly, FIGS. 10 and 11, showing the first click of the left button 86, preferably have a total duration close to the time duration it takes for a user to click and release the left button of a real mouse. Also, FIGS. 12 and 13, which show the time between button clicks, should be a short enough total duration that the user is aware that the two button clicks should be quick enough that the computer interprets them as a double click, rather than as two isolated single clicks. Finally, the final image of FIG. 14 may be displayed for a fixed time, preferably a suitably long time so that the user can view and think about what the help information has shown. Alternatively, the final image may be displayed until the user takes a suitable action, such as typing a control key or moving the system cursor.

INVOKING HELP

It is likely that a given icon or other display symbol will be amenable to having a plurality of different kinds of help. For instance, help for a given object such as a document might include how to open it, how to delete it, how to move it, how to copy it, etc. For a printer represented by an icon, help might be directed to installation, assigning a logical name, selecting a driver, etc.

Figure 15:
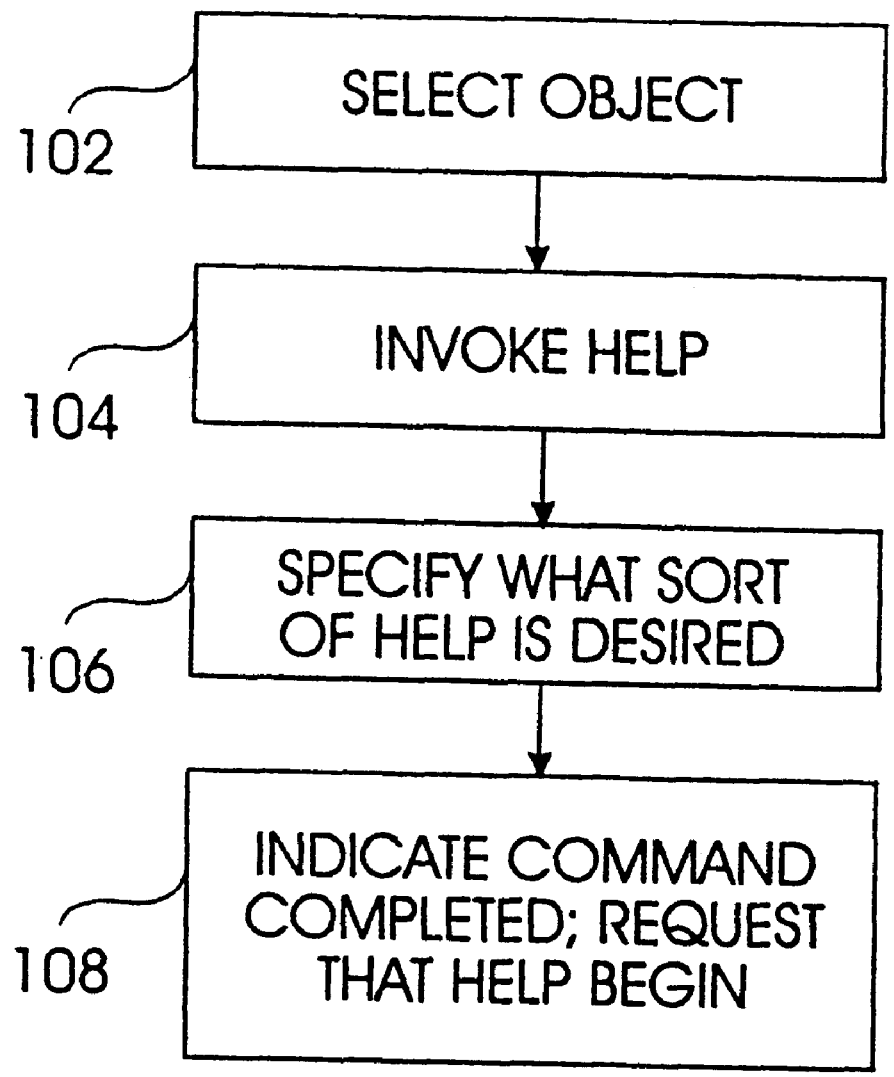

The user interface should allow for these options. Therefore, the step 32 of taking a user action, shown schematically in FIG. 2, may be elaborated upon, such as in the manner given in the flowchart of FIG. 15.

Initially, the user selects an object (step 102). This may be done by moving a system cursor onto an icon or other symbol in the graphical user interface. In accordance with the particular workings of the system supporting help according to the invention, the icon may be highlighted in a suitable fashion, merely to indicate that the cursor has been positioned on it.

In step 104, the user makes a general invocation of the system help function. There are may ways of doing this. One exemplary way is to click on the right mouse button after using the mouse to position the cursor on the displayed symbol. Conventionally, doing so opens a menu, through which the user may select settings for the object, open the object, get help for the object, etc., by making a menu selection. In accordance with the invention, the user proceeds to select and obtain help as described here.

Where a plurality of types of help are available, the user specifies the type desired (step 106). A preferred way of doing so is by keying in the function for which the user desires help. For instance, where help is desired for deleting or copying a document, the user invokes help as per steps 102 and 104, and then types keys for the DELETE or COPY function, respectively.

Finally, in step 108, the user indicates that the help request is completed, and requests that the help information begin. This step is the equivalent of typing ENTER or CARRIAGE RETURN after keying in a text-oriented command. In a graphical user interface, it might alternatively be accomplished by a mouse activity such as a left button click.

Thus, in summary, invoking a particular form of help for a given displayed object is preferably obtained by positioning a cursor, right-clicking, entering a keyboard command, and finally left-clicking. Other suitable arrangements may equivalently be used, taking full advantage of the type of user interface provided. For instance, speaking into a system having audio reception and speech recognition capability, or touching a displayed symbol on a touch-sensitive screen may alternatively be employed for the above-described functionality.

Using the foregoing specification, the invention may be implemented using standard programming and/or engineering techniques using computer programming software, firmware, hardware or any combination or subcombination thereof. Any such resulting program(s), having computer readable program code means, may be embodied or provided within one or more computer readable or usable media such as fixed (hard) drives, disk, diskettes, optical disks, magnetic tape, semiconductor memories such as read-only memory (ROM), etc., or any transmitting/receiving medium such as the Internet or other communication network or link, thereby making a computer program product, i.e., an article of manufacture, according to the invention. The article of manufacture containing the computer programming code may be made and/or used by executing the code directly from one medium, by copying the code from one medium to another medium, or by transmitting the code over a network.

An apparatus for making, using, or selling the invention may be one or more processing systems including, but not limited to, a central processing unit (CPU), memory, storage devices, communication links, communication devices, servers, I/O devices, or any subcomponents or individual parts of one or more processing systems, including software, firmware, hardware or any combination or subcombination thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention. While the preferred embodiment of the present invention has been illustrated in detail, it should be apparent that modifications and adaptations to that embodiment may occur to one skilled in the art without departing from the spirit or scope of the present invention as set forth in the following claims.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. For use with a graphical user interface computer system (GUI system), a method for providing a user with information on a plurality of types of functionality of the GUI system associated with a symbol displayed on the GUI system, the method comprising the steps of:

providing the user with user interface information to allow the user to select one of the plurality of types of functionality of the GUI system associated with the displayed symbol; and responsive to an initial user selection of one of the plurality of types of functionality, displaying a plurality of images, the plurality of images representing respective aspects of the selected type of functionality of the GUI system associated with the symbol, without requiring an intervening user action before each of the plurality of images are displayed.

2. A method as recited in claim 1, wherein the step of displaying a plurality of images includes displaying the images in close proximity to the symbol.

3. A method as recited in claim 1, wherein:

the functionality of the GUI system includes a sequence of stages; and the step of displaying a plurality of images includes displaying an animated sequence of images, each image of the animated sequence corresponding with a respective one of the stages.

4. A method as recited in claim 3, further comprising the step of statically displaying at least one static image corresponding with one of the images of the animated sequence, the at least one static image further corresponding with one of the stages of the functionality of the GUI system, whereby the user is reminded of the stage of the functionality of the GUI system by observing the static image.

5. A method as recited in claim 4, wherein the static image is initially displayed simultaneously with the corresponding image of the animated sequence, and is displayed statically thereafter.

6. A method as recited in claim 1, wherein:

the functionality of the GUI system includes at least one user input from a mouse; and the sequence of images includes images of a mouse receiving the user input.

7. A method as recited in claim 6, wherein the user input includes manipulation of a mouse button; and the sequence of images includes images of a mouse having mouse buttons, the images indicating the manipulation of the mouse button.

8. A graphical user interface computer system (GUI system) for providing a user with information on a plurality of types of functionality of the GUI system associated with a symbol displayed on the GUI system, the GUI system comprising:

a graphical user interface display;

a user input device for allowing the user to provide a user input to the GUI system;

means for providing the user with user interface information to allow the user to select one of the plurality of types of functionality of the GUI system associated with the displayed symbol; and means, operable responsive to an initial user selection of one of the plurality of types of functionality, for displaying a plurality of images on the graphical user interface display, the plurality of images representing respective aspects of the selected type of functionality of the GUI system associated with the symbol, without requiring an intervening user action before each of the plurality of images are displayed.

9. A GUI system as recited in claim 8, wherein the means for displaying a plurality of images includes means for displaying the images in close proximity to the symbol.

10. A GUI system as recited in claim 8, wherein:

the functionality of the GUI system includes a sequence of stages; and the means for displaying a plurality of images includes means for displaying an animated sequence of images, each image of the animated sequence corresponding with a respective one of the stages.

11. A GUI system as recited in claim 10, further comprising means for statically displaying at least one static image corresponding with one of the images of the animated sequence, the at least one static image further corresponding with one of the stages of the functionality of the GUI system, whereby the user is reminded of the stage of the functionality of the GUI system by observing the static image.

12. A GUI system as recited in claim 11, wherein the static image is initially displayed simultaneously with the corresponding image of the animated sequence, and is displayed statically thereafter.

13. A GUI system as recited in claim 8, wherein:

the functionality of the GUI system includes at least one user input from a mouse; and the sequence of images includes images of a mouse receiving the user input.

14. A GUI system as recited in claim 13, wherein the user input includes manipulation of a mouse button; and the sequence of images includes images of a mouse having mouse buttons, the images indicating the manipulation of the mouse button.

15. A computer program product, for use with a graphical user interface computer system (GUI system), for providing a user with information on a plurality of types of functionality of the GUI system associated with a symbol displayed on the GUI system, the computer program product comprising:

a computer-readable medium; and means, provided on the medium, for directing the GUI system to allow the user to provide a user input to the GUI system;

means, provided on the medium, for directing the GUI system to provide the user with user interface information to allow the user to select one of the plurality of types of functionality of the GUI system associated with the displayed symbol; and means, provided on the medium, operable responsive to an initial user selection of one of the plurality of types of functionality, for directing the GUI system to display a plurality of images on the graphical user interface display, the plurality of images representing respective aspects of the selected type of functionality of the GUI system associated with the symbol, without requiring an intervening user action before each of the plurality of images are displayed.

16. A computer program product as recited in claim 15, wherein the means for directing to display a plurality of images includes means, provided on the medium, for directing the GUI system to display the images in close proximity to the symbol.

17. A computer program product as recited in claim 15, wherein:

the functionality of the GUI system includes a sequence of stages; and the means for directing to display a plurality of images includes means, provided on the medium, for directing the GUI system to display an animated sequence of images, each image of the animated sequence corresponding with a respective one of the stages.

18. A computer program product as recited in claim 17, further comprising means, provided on the medium, for directing the GUI system to statically display at least one static image corresponding with one of the images of the animated sequence, the at least one static image further corresponding with one of the stages of the functionality of the GUI system, whereby the user is reminded of the stage of the functionality of the GUI system by observing the static image.

19. A computer program product as recited in claim 17, wherein the static image is initially displayed simultaneously with the corresponding image of the animated sequence, and is displayed statically thereafter.

20. A computer program product as recited in claim 15, wherein:

the functionality of the GUI system includes at least one user input from a mouse; and the sequence of images includes images of a mouse receiving the user input.

21. A computer program product as recited in claim 20, wherein the user input includes manipulation of a mouse button; and the sequence of images includes images of a mouse having mouse buttons, the images indicating the manipulation of the mouse button.

* * * * *